(12) United States Patent
Gabe et al.

(10) Patent No.: US 8,713,916 B2
(45) Date of Patent: May 6, 2014

(54) NOX PURIFICATION SYSTEM AND METHOD FOR CONTROL OF NOX PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 366 days.

(21) Appl. No.: 12/452,138

(22) PCT Filed: May 12, 2008

(86) PCT No.: PCT/JP2008/058721
§ 371 (c)(1),
(2), (4) Date: Dec. 17, 2009

(87) PCT Pub. No.: WO2009/001623
PCT Pub. Date: Dec. 31, 2008

(65) Prior Publication Data
US 2010/0101218 A1    Apr. 29, 2010

(30) Foreign Application Priority Data

Jun. 26, 2007 (JP) .................................. 2007-167570

(51) Int. Cl.
*F01N 3/00* (2006.01)
(52) U.S. Cl.
USPC .................................................... 60/285
(58) Field of Classification Search
USPC .................................................... 60/285
See application file for complete search history.

(56) References Cited

U.S. PATENT DOCUMENTS

| | | | |
|---|---|---|---|
| 5,735,251 A * | 4/1998 | Hyodo et al. ................. | 123/518 |
| 6,701,707 B1 * | 3/2004 | Upadhyay et al. .............. | 60/277 |
| 6,877,313 B1 * | 4/2005 | Phillips et al. ................. | 60/297 |
| 6,988,361 B2 * | 1/2006 | van Nieuwstadt et al. ..... | 60/295 |
| 7,111,455 B2 * | 9/2006 | Okugawa et al. .............. | 60/295 |
| 7,137,246 B2 * | 11/2006 | van Nieuwstadt et al. ..... | 60/295 |

(Continued)

FOREIGN PATENT DOCUMENTS

| | | |
|---|---|---|
| JP | 2004-60515 | 2/2004 |
| JP | 2005-002968 | 1/2005 |

(Continued)

OTHER PUBLICATIONS

Patent Abstract of Japan, Publication No. 2005-002968, Published Jan. 6, 2005.

(Continued)

*Primary Examiner* — Thomas Denion
*Assistant Examiner* — Jason Shanske
(74) *Attorney, Agent, or Firm* — Staas & Halsey LLP (57) ABSTRACT

An NOx purification system and a method for control of the NOx purification system. Two oxidation catalysts are provided upstream of an ammonia solution supply unit, and an in-cylinder fuel injection is so controlled that hydrocarbon in exhaust gas is mainly oxidized by an upstream one of the oxidation catalysts and nitric oxide in the exhaust gas is mainly oxidized by a relatively downstream one of the oxidation catalysts. NOx in the exhaust gas is purified by feeding an ammonia solution to a selective reduction NOx catalyst. The system adjusts to the concentrations of HC, NO and $NO_2$ going to the selective reduction NOx catalyst to proper values so as to purify the NOx efficiently by the selective reduction NOx catalyst, and improve NOx purification performance in a lower temperature range.

6 Claims, 4 Drawing Sheets

(56) References Cited

U.S. PATENT DOCUMENTS

| | | | |
|---|---|---|---|
| 2003/0145581 A1* | 8/2003 | Tashiro et al. | 60/286 |
| 2004/0000139 A1* | 1/2004 | Kawashima et al. | 60/295 |
| 2004/0133335 A1* | 7/2004 | Nakano et al. | 701/103 |
| 2004/0194451 A1 | 10/2004 | Kawatani et al. | |
| 2005/0109022 A1* | 5/2005 | Nagaoka et al. | 60/297 |
| 2005/0132698 A1* | 6/2005 | Nagaoka et al. | 60/295 |
| 2005/0252197 A1* | 11/2005 | Nieuwstadt et al. | 60/277 |
| 2006/0153761 A1* | 7/2006 | Bandl-Konrad et al. | 423/239.1 |
| 2007/0036694 A1 | 2/2007 | Nishioka et al. | |
| 2007/0243115 A1 | 10/2007 | Tsumagari et al. | |

FOREIGN PATENT DOCUMENTS

| | | |
|---|---|---|
| JP | 2006-70771 | 3/2006 |
| JP | 200732472 | 2/2007 |
| JP | 2007-85247 | 4/2007 |
| JP | 2007-132202 | 5/2007 |

OTHER PUBLICATIONS

Patent Abstract of Japan, Publication No. 2007-132202, Published May 31, 2007.
Patent Abstract of Japan, Publication No. 2007-085247, Published Apr. 5, 2007.
Patent Abstract of Japan, Publication No. 2006-070771, Published Mar. 16, 2006.
Patent Abstract of Japan, Publication No. 2004-060515, Published Feb. 26, 2004.
Front page of Publication No. WO 2006/022213 with English Abstract.
Patent Abstract of Japan, Publication No. 2007-32472, Published Feb. 8, 2007.
Front page of Publication No. EP 1748162 with English Abstract.
International Search Report of the International Application No. PCT/JP2008/058721 (mailed Oct. 21, 2008).

* cited by examiner

NOX PURIFICATION SYSTEM AND METHOD FOR CONTROL OF NOX PURIFICATION SYSTEM

This application claims the benefit under U.S.C. Section 371, of PCT International Application No. PCT/JP2008/058721, filed May 12, 2008 and Japanese Application No. 2007-167570 filed Jun. 26, 2007, the contents of which are incorporated herein by reference.

TECHNICAL FIELD

The present invention relates to a NOx purification system including oxidation catalysts on the upstream side of an exhaust gas passage and a selective reduction NOx catalyst (SCR catalyst) on the downstream side of the passage, and also relates to a method for control of the NOx purification system.

BACKGROUND ART

The regulations on particulate matters (PM), nitrogen oxides (NOx), carbon monoxide (CO), hydrocarbon (HC), etc. emitted from diesel engines have been strengthened year after year. With the strengthening of the regulations, improving engines is no longer enough to address the regulations. Accordingly, techniques have been developed and employed for reducing these materials emitted from an engine. In the techniques, an exhaust gas passage is provided with an exhaust gas post-treatment device using catalysts.

Figure 4:
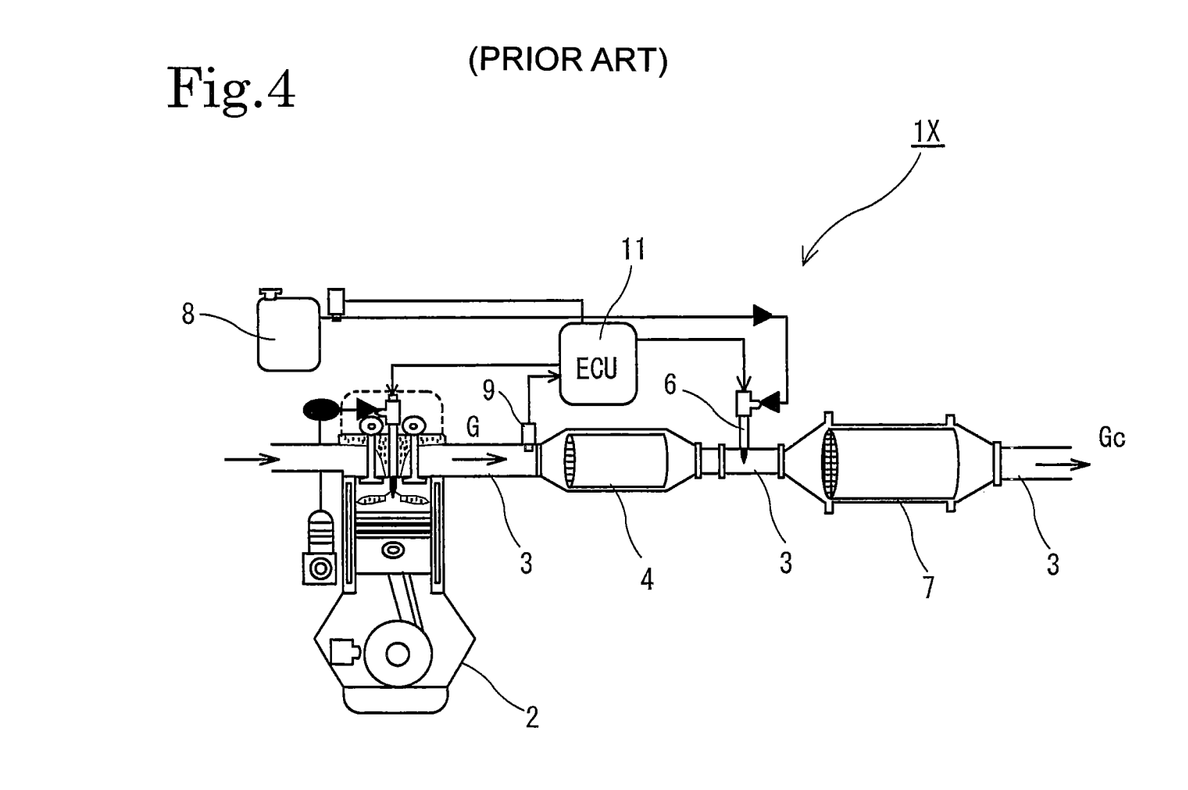
FIG. 4 is a diagram schematically illustrating the configuration of a conventional NOx purification system.

As shown in FIG. 4, a conventional NOx purification system 1X including a selective reduction NOx catalyst (SCR catalyst) 7 for reducing NOx is provided with the selective reduction NOx catalyst 7 and an ammonia solution supply unit 6 upstream thereof. The ammonia solution supply unit 6 is a device for feeding ammonia ($NH_3$) to the selective reduction NOx catalyst 7 and supplies an ammonia solution, such as aqueous urea, that becomes an ammonia source, into the exhaust gas G in an exhaust gas passage 3. The urea fed into the exhaust gas passage 3 produces ammonia by being hydrolyzed by heat of the exhaust gas G, or hydrolyzed through the hydrolyzing function, given to the ammonia selective reduction NOx catalyst 7, using heat and steam in the exhaust gas G. In some cases, alternatively, urea is converted into ammonia by a hydrolysis catalyst provided between the ammonia solution supply unit 6 and the ammonia selective reduction NOx catalyst 7. This hydrolysis reaction is represented by "$(NH_2)_2CO + H_2O \rightarrow 2NH_3 + CO_2$".

Using the produced ammonia as a reducing agent, a selective catalytic NOx reduction is performed on the selective reduction NOx catalyst to purify NOx. Such reactions progress even if oxygen coexists, and 1 mole of ammonia ($NH_3$) reacts per mole of nitric oxide (NO). Among such reactions, "$NO + NO_2 + 2NH_3 \rightarrow 2N_2 + 3H_2O$" has the fastest reaction rate, and "$4NO + 4NH_3 + O_2 \rightarrow 4N_2 + 6H_2O$" has the second fastest. There are other reactions such as "$6NO + 4NH_3 \rightarrow 5N_2 + 6H_2O$", "$2NO_2 + 4NH_3 + O_2 \rightarrow 3N_2 + 6H_2O$", and "$6NO_2 + 8NH_3 \rightarrow 7N_2 + 12H_2O$", but these reactions are relatively slow.

Figure 3:
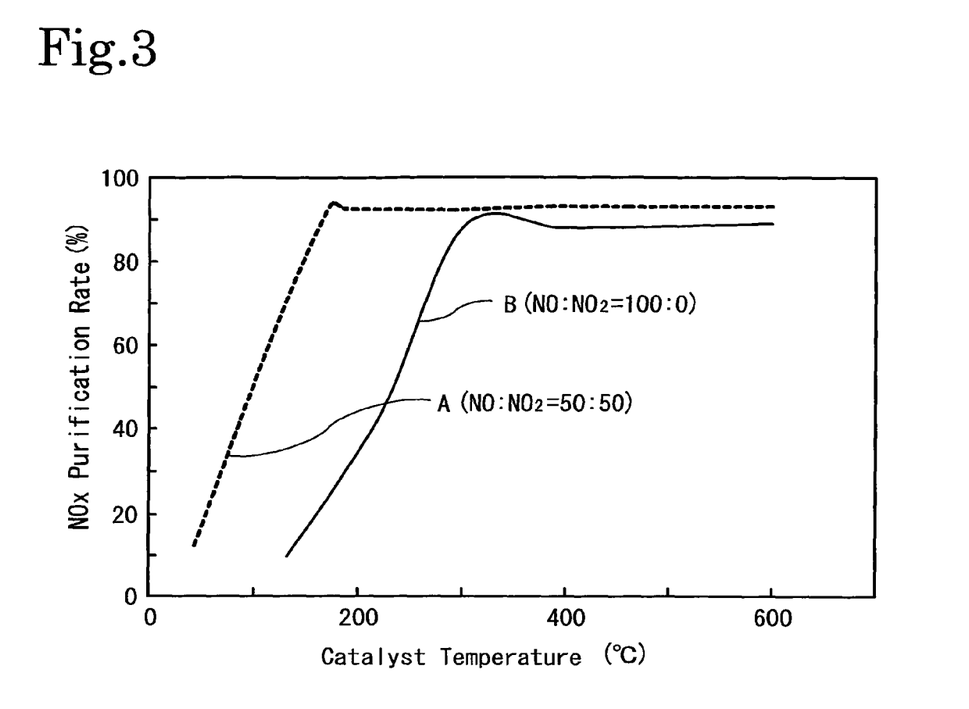
FIG. 3 is a graph illustrating the NO:NO$_2$ ratio versus the NOx purification rate for a selective reduction NOx catalyst.

Due to the difference in the reaction rate of these chemical reactions, in the NOx purification system using the selective reduction NOx catalyst, the NOx purification performance is greatly influenced by the ratio between nitric oxide (NO) and nitrogen dioxide ($NO_2$) that are coexisting gas in the exhaust gas supplied to the selective reduction NOx catalyst. FIG. 3 shows the NOx purification performances obtained as the result of simulated gas tests performed with different ratios between NO and $NO_2$ coexisting in the supplied exhaust gas in a urea-SCR catalyst system. It can be seen that in the case of $NO:NO_2=50:50$ (1:1), in which $NO_2$ coexists (dotted line A), the NOx purification performance is improved over the whole catalyst temperature range, as compared to the case of $NO:NO_2=100:0$ (1:0), in which $NO_2$ does not coexist (solid line B). Especially, the improvement in the NOx purification performance is significant in the lower temperature range.

It is considered best that the $NO:NO_2$ ratio is 50:50. However, the ratio of $NO_2$ is extremely small in the $NO:NO_2$ ratio in the exhaust gas emitted from diesel engines. This is one of the factors for degradation in the NOx purification performance in the low temperature range. Accordingly, in most of the NOx purification systems using a selective reduction NOx catalyst, the $NO_2$ ratio is increased to improve NOx purification performance in the low temperature range. The $NO_2$ ratio is increased by oxidizing NO in exhaust gas, using an oxidation catalyst provided upstream of an ammonia solution supply unit such as a urea delivery valve.

Moreover, hydrocarbon (HC), being part of fuel, are supplied to the upstream (prior) oxidation catalyst from the engine through control of the in-cylinder fuel injection, and are oxidized by the oxidation catalyst. This allows the oxidation reaction heat to increase the temperature of the exhaust gas. Moreover, in conjunction with control of the temperature rise of the exhaust gas at lower temperature, the NOx purification performance in a lower temperature range is further improved.

However, if HC coexist in the exhaust gas in the oxidation reaction from NO to $NO_2$ in the upstream oxidation catalyst, the reduction reaction of $NO_2$ proceeds preferentially over that of the HC, reducing the generated $NO_2$ back to NO. Accordingly, the increase of $NO_2$ cannot be expected from the conventional NOx purification systems. This leads to a problem that the NOx purification performance does not improve. Additionally, in some cases, in a lower temperature range, HC are supplied from an engine to an oxidation catalyst to allow the oxidation reaction heat to increase the temperature of the exhaust gas. In such cases, HC that are not oxidized serve as a reducing agent, leading to a decrease of $NO_2$. Thus, there is also a problem that the NOx purification performance in a lower temperature range is prevented from improving.

There has been proposed an internal combustion engine's exhaust purification device considering the $NO:NO_2=50:50$, as described in, for example, Japanese patent application Kokai publication No. 2005-2968. The device includes a strong oxidation catalyst, an aqueous urea injection nozzle, and a SCR catalyst, starting from the upstream side of an exhaust system of the internal combustion engine. The purification device is provided with a switching valve for switching between an oxidation catalytic bypass for bypassing the strong oxidation catalyst and an exhaust gas passage. The switching valve causes the exhaust gas to flow into the oxidation catalytic bypass when the exhaust gas has a temperature at which the $NO_2$ conversion rate of the strong oxidation catalyst is not less than 50%. Thereby, the device prevents generation of excessive $NO_2$, which would cause the decrease in the NOx purification efficiency in the SCR catalyst. Furthermore, it has been proposed to provide the oxidation catalytic bypass passage with a weak oxidation catalyst that has a NO conversion rate of no more than 50%.

However, such exhaust purification device of an internal combustion engine needs to be provided with a parallel passage including the oxidation catalytic bypass and/or the weak oxidation catalyst, and with the valve for switching the passages. This may lead to a problem of an increase in size of the NOx purification system. Moreover, at the temperature less than a given temperature at which the exhaust gas does not pass through the oxidation catalytic bypass, the oxidation reaction heat in the oxidation catalyst cannot increase the exhaust gas temperature.

SUMMARY OF THE INVENTION

The present invention has been made to solve the above problems, and has an object to provide a NOx purification system including oxidation catalysts and a selective reduction NOx catalyst and a method for control of the NOx purification system. In the purification of a NOx in the exhaust gas by feeding an ammonia solution for NOx reduction to the selective reduction NOx catalyst, the NOx is purified efficiently by the selective reduction NOx catalyst by adjusting the concentrations of HC, NO, and $NO_2$ in the exhaust gas flowing into the selective reduction NOx catalyst to proper values. Thereby, the NOx purification performance in a lower temperature range can be improved.

To achieve the above object, a NOx purification system for reducing NOx in exhaust gas includes, an oxidation catalyst, an ammonia solution supply unit for feeding an ammonia solution to the exhaust gas passage and a selective reduction NOx catalyst in an exhaust passage from the upstream side thereof, and includes a control unit for controlling in-cylinder fuel injection. In the NOx purification system, the oxidation catalyst includes two oxidation catalyst, and the control unit controls the in-cylinder fuel injection so that hydrocarbon in the exhaust gas is mainly oxidized by an upstream oxidation catalyst and nitric oxide in the exhaust gas is mainly oxidized by a downstream oxidation catalyst.

With this configuration, the upstream oxidation catalyst oxidizes hydrocarbon (HC) constantly emitted from an engine and hydrocarbon (HC) emitted by the exhaust gas temperature rise control. This prevents the temperature rise of the exhaust gas and flow of the hydrocarbon into the downstream oxidation catalyst, improving NO oxidation activity in the downstream oxidation catalyst for oxidizing nitric oxide (NO). The downstream oxidation catalyst efficiently oxidizes nitric oxide to nitrogen dioxide ($NO_2$), allowing the NO:$NO_2$ ratio in the exhaust gas flowing into the selective reduction NOx catalyst (SCR catalyst) to approach 50:50 (=1:1). This improves the efficiency of the NOx reduction reaction in the selective reduction NOx catalyst. Consequently, the NOx purification performance in the NOx purification system, especially the NOx purification performance in a lower temperature range can be improved.

In addition, in the above NOx purification system, the control unit is configured to control the in-cylinder fuel injection, based on a value detected by an oxygen concentration sensor disposed upstream of the upstream oxidation catalyst, so that an oxygen concentration of the exhaust gas flowing into the upstream oxidation catalyst equals an oxygen concentration of the exhaust gas at which most of the hydrocarbon in the exhaust gas is oxidized by the upstream oxidation catalyst. This configuration can prevent the hydrocarbon in the exhaust gas from flowing into the downstream oxidation catalyst without being oxidized.

In addition, in the above NOx purification system, the control unit is configured to control the in-cylinder fuel injection, based on a value detected by an exhaust gas temperature sensor disposed upstream of the downstream oxidation catalyst, so that a ratio between nitric oxide and nitrogen dioxide in the exhaust gas flowing into the selective reduction NOx catalyst equals 50:50. The reaction rate from nitric oxide to nitrogen dioxide is associated with the catalyst temperature. Accordingly, by controlling the exhaust gas temperature directly associated with the catalyst temperature, the reaction from nitric oxide to nitrogen dioxide can be adjusted so that the ratio between nitric oxide and nitrogen dioxide may equal 50:50. This can promote the reduction reaction of NOx in the selective reduction NOx catalyst, and thus improve the NOx purification performance.

Moreover, the above NOx purification system is configured to give at least one of the upstream oxidation catalyst and the downstream oxidation catalyst a function of collecting particulate matters in the exhaust gas. This configuration allows collection and removal of the PM in the exhaust gas, and also allows combustion of the collected PM when the oxidation catalyst is warmed. Accordingly, the heat generated by the oxidation of the PM can be utilized to warm the exhaust gas.

Moreover, to achieve the above object, a method for control of a NOx purification system for reducing NOx in exhaust gas is characterized as follows. The NOx purification system includes, in an exhaust gas passage from the upstream side thereof, an upstream oxidation catalyst, a downstream oxidation catalyst, an ammonia solution supply unit for feeding an ammonia solution to the exhaust gas passage, and a selective reduction NOx catalyst, and includes a control unit for controlling in-cylinder fuel injection. The in-cylinder fuel injection is so controlled that hydrocarbon in the exhaust gas is mainly oxidized by the upstream oxidation catalyst and nitric oxide in the exhaust gas is mainly oxidized by the downstream oxidation catalyst. This control method can improve the NOx purification performance in the NOx purification system, especially the NOx purification performance in a lower temperature range.

In addition, in the above method for control of a NOx purification system, the in-cylinder fuel injection is controlled, based on a value detected by an oxygen concentration sensor disposed upstream of the upstream oxidation catalyst, so that an oxygen concentration of the exhaust gas flowing into the upstream oxidation catalyst equals an oxygen concentration of the exhaust gas at which most of the hydrocarbon in the exhaust gas is oxidized by the upstream oxidation catalyst. This control method can prevent the hydrocarbon in the exhaust gas from flowing into the downstream oxidation catalyst without being oxidized.

In addition, in the above method for control of a NOx purification system, the in-cylinder fuel injection is controlled, based on a value detected by an exhaust gas temperature sensor disposed upstream of the downstream oxidation catalyst, so that a ratio between nitric oxide and nitrogen dioxide in the exhaust gas flowing into the selective reduction NOx catalyst equals 50:50. This control method can promote the reduction reaction of NOx in the selective reduction NOx catalyst, and thus improve the NOx purification performance.

In accordance with the NOx purification system and the method for control of a NOx purification system according to the present invention, the upstream oxidation catalyst can improve the NO oxidation activity in the downstream oxidation catalyst for oxidizing nitric oxide (NO), by oxidizing hydrocarbon (HC) to warm the exhaust gas and prevent the hydrocarbon from inflowing into the downstream oxidation catalyst. This allows: the downstream oxidation catalyst to efficiently oxidize nitric oxide to nitrogen dioxide ($NO_2$); the NO:$NO_2$ ratio in the exhaust gas flowing into the selective reduction NOx catalyst (SCR catalyst) to approach 50:50 (=1:1); and the efficiency of the NOx reduction reaction in the selective reduction NOx catalyst to be improved. Thus, especially the NOx purification performance in a lower temperature range can be improved, and the NOx purification performance of the selective reduction NOx catalyst can be enhanced over the whole temperature range.

DESCRIPTION OF THE EMBODIMENTS

Figure 1:
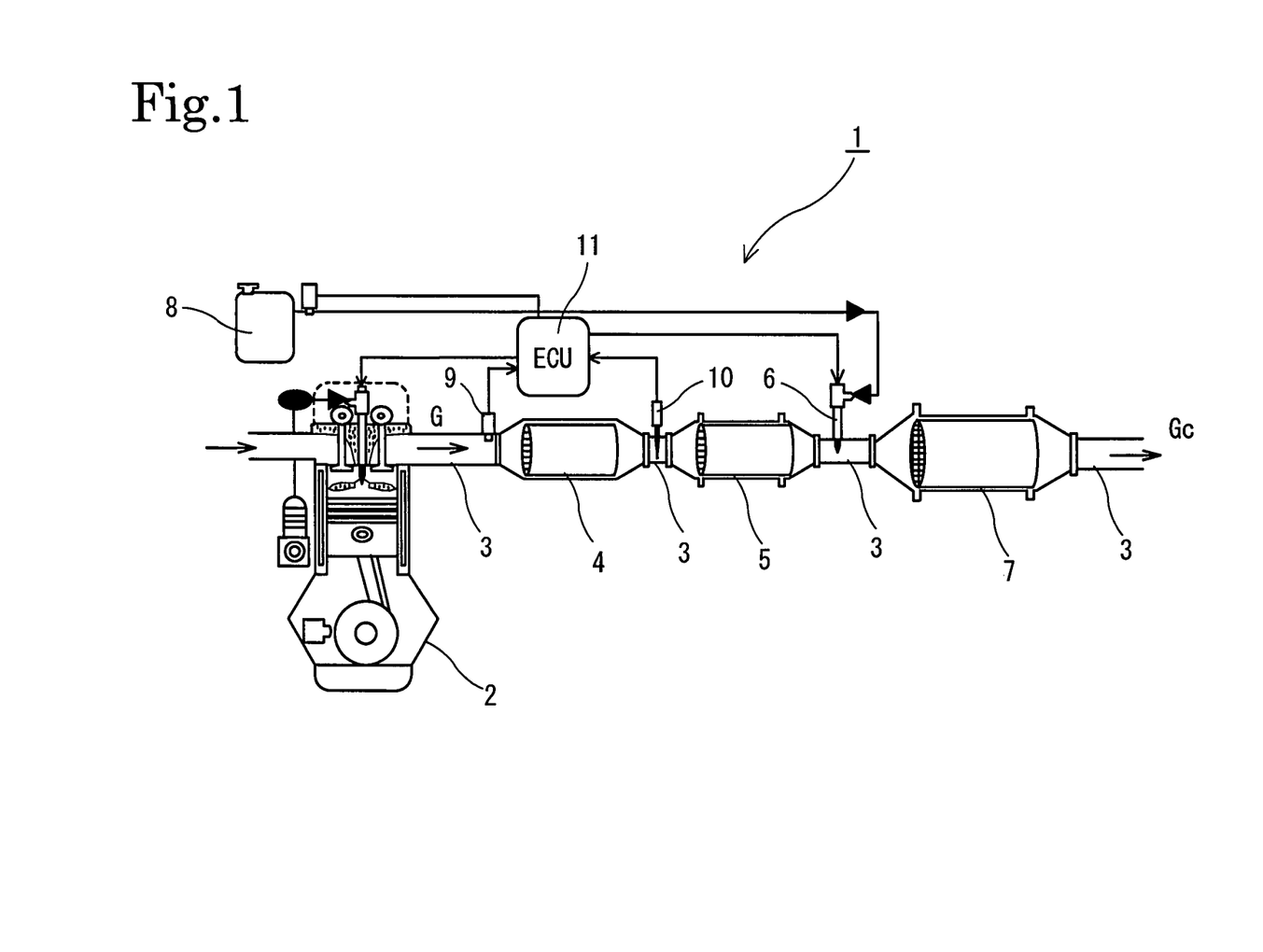
FIG. 1 is a diagram schematically illustrating a NOx purification system according to an embodiment of the present invention.

With reference to the drawings, a NOx purification system and a method for control of the NOx purification system according to embodiments of the present invention will now be described by way of example of a NOx purification system for purifying NOx in the exhaust gas passing through the exhaust passage of a diesel engine. FIG. 1 shows a NOx purification system 1 of an embodiment of the present invention.

In the NOx purification system 1, an upstream oxidation catalyst 4, a downstream oxidation catalyst 5, an ammonia solution supply unit (urea delivery valve) 6, and a selective reduction NOx catalyst (SCR catalyst) 7 are provided in an exhaust gas passage 3 of a diesel engine 2, starting from the upstream side of the passage.

The upstream oxidation catalyst 4 and the downstream oxidation catalyst 5 are formed by causing palladium, cerium oxide, platinum, aluminum oxide, etc. to be supported on a support of a porous ceramic, such as a cordierite honeycomb, having a honeycomb structure or the like. The upstream oxidation catalyst 4 oxidizes unburned fuel (hydrocarbon: HC), carbon monoxide (CO), etc. if they exist in the exhaust gas. The heat generated by this oxidation warms the exhaust gas, and the warmed exhaust gas can warm the downstream oxidation catalyst 5 and the selective reduction NOx catalyst 7. The downstream oxidation catalyst 5 oxidizes nitric oxide (NO) to nitrogen dioxide (NO$_2$) so that the NO:NO$_2$ ratio may equal 50:50 (=1:1). This improves the NOx purification performance in the selective reduction NOx catalyst 7 on the downstream side.

The ammonia solution supply unit 6 is a device for supplying the selective reduction NOx catalyst with ammonia (NH$_3$) which serves as a reducing agent for reducing NOx. The ammonia solution supply unit 6 is formed by an injection valve and the like. With the injection valve, an ammonia solution, such as an aqueous urea solution or an aqueous ammonia solution, is injected from an ammonia solution tank 8 to the exhaust gas passage 3.

The selective reduction NOx catalyst 7 is formed by causing titania-vanadium, zeolite, chromic oxide, manganese oxide, molybdenum oxide, titanium oxide, tungsten oxide, etc. to be supported on a support of cordierite, aluminum oxide, titanium oxide, etc. having a honeycomb structure or the like. With this structure, the selective reduction NOx catalyst 7 has the function of reducing and purifying NOx by ammonia.

Moreover, an oxygen concentration sensor (λ sensor) 9 for determining the oxygen concentration in the exhaust gas is disposed upstream of the upstream oxidation catalyst 4, and an exhaust gas temperature sensor 10 for determining the temperature in the exhaust gas is disposed between the upstream oxidation catalyst 4 and the downstream oxidation catalyst 5.

Additionally, a control unit 11 called ECU (engine control unit) for controlling the overall operations of the engine 2 is provided. The followings are inputted to the control unit 11: the operational status of the engine 2 (such as, for example, engine speed Ne and load (fuel injection volume) Q), the oxygen concentration detected by the oxygen concentration sensor 9, the temperature detected by the exhaust gas temperature sensor 10, etc. Based on these input data, the control unit 11 controls an electronic common-rail injection unit fuel injection system, an EGR valve, an intake air throttle valve, etc. disposed in the engine 2. Thereby, the amount of hydrocarbon (HC) in the exhaust gas emitted from the engine 2 and the exhaust gas temperature are controlled.

In the NOx purification system 1, hydrocarbon (HC) in the exhaust gas G emitted from the engine 2 is oxidized by the upstream oxidation catalyst 4. Then, after the gas G passes through the upstream oxidation catalyst 4, nitric oxide (NO) is oxidized to nitrogen dioxide (NO$_2$) by the downstream oxidation catalyst 5. Then the exhaust gas G is supplied with an ammonia solution by the ammonia solution supply unit 6 (the ammonia solution is added to the exhaust gas G). Utilizing the ammonia generated from the ammonia solution as a reducing agent, NOx in the exhaust gas G is reduced and purified by the selective reduction NOx catalyst 7. Purified exhaust gas Gc is released in the atmosphere through the exhaust gas passage 3.

Figure 2:
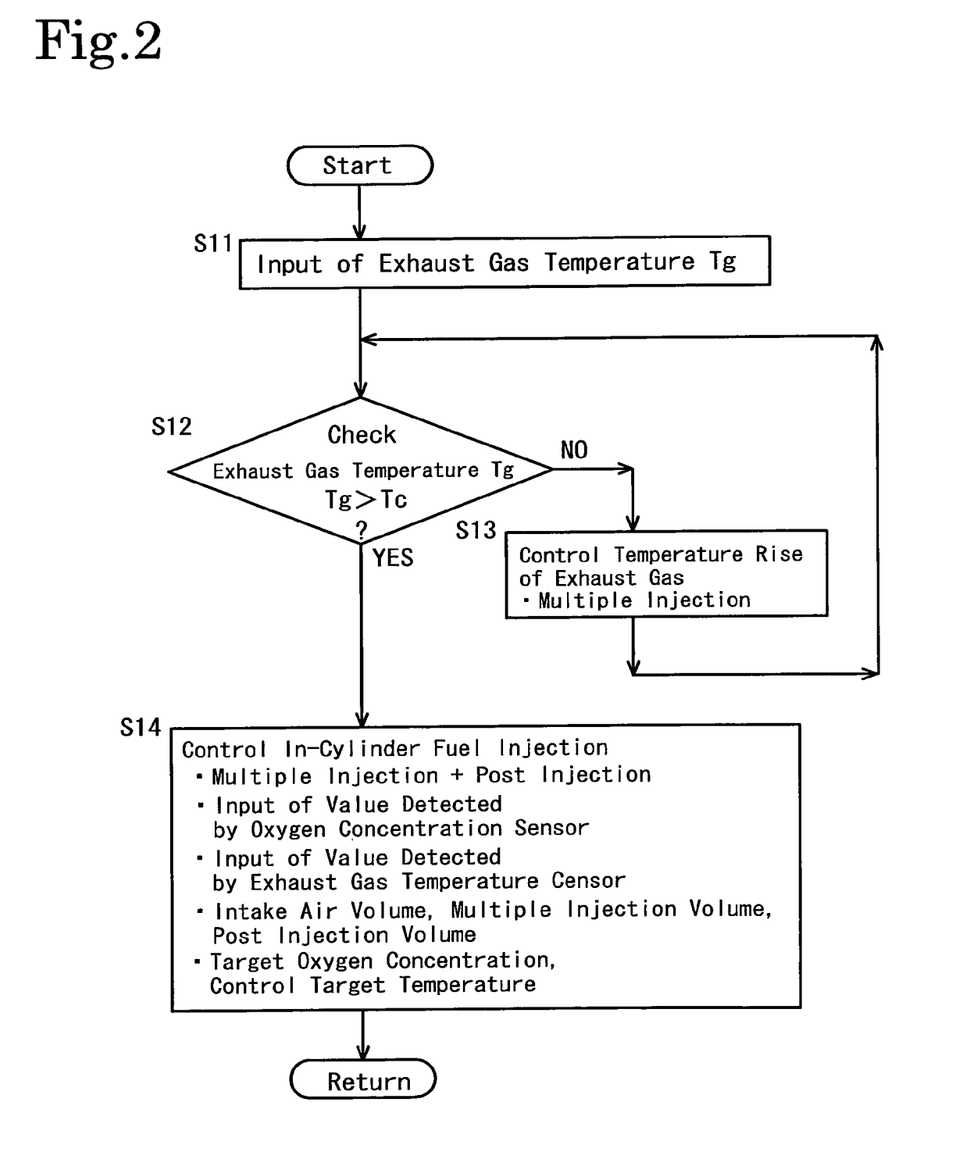
FIG. 2 is a diagram of a control flow illustrating a method for control of the NOx purification system according to the present invention.

In the present invention, the control unit 11 performs control functions in the NOx purification system 1 as follows in accordance with the control flow illustrated in FIG. 2. When the operation of the engine 2 starts, the control flow of FIG. 2 is repeatedly invoked by the control flow for controlling the operation of the engine 2 and is performed when NOx purification is necessary. When the operation of the engine 2 stops, the control flow terminates in conjunction with the control flow for controlling the operation of the engine 2.

When the control flow of the FIG. 2 is invoked, the process starts. In step S11, the control unit 11 receives input of the value detected by the exhaust gas temperature sensor 10. In step S12, an exhaust gas temperature Tg is checked. If the exhaust gas temperature Tg is not higher than a determination temperature Tc at which the oxidation catalyst reaches the activation temperature range (NO), in step S13 control is performed for exhaust gas temperature rise. On the other hand, if the exhaust gas temperature Tg is higher than the determination temperature Tc (YES), the process proceeds to step S14. The control of the exhaust gas temperature rise performed in step S13 is, for example, multiple injection (multi-stage retarded injection) in in-cylinder fuel injection, performed for a given period of time (the time associated with the interval of the check on the exhaust gas temperature). The control of the exhaust gas temperature rise is continued until the exhaust gas temperature Tg becomes higher than the determination temperature Tc in the check on the exhaust gas temperature in step S12.

In steps S11 to S13, if the exhaust gas temperature Tg is low due to a low load range, etc., the NOx purification activity of the selective reduction NOx catalyst 7 is low and the NOx purification performance is low, as well as the HC oxidation activity of the upstream oxidation catalyst 4 and the NO oxidation activity of the downstream oxidation catalyst 5 are also low. Therefore, the overall NOx purification performance is extremely degraded. To avoid such degradation, the exhaust gas temperature Tg is increased by such techniques as multiple injection (multi-stage retarded injection) in the engine until the upstream oxidation catalyst 4 reaches the activation temperature range. The temperature is checked by the exhaust gas temperature sensor 10 located downstream of the upstream oxidation catalyst 4. Although the determination temperature Tc varies depending on the type of the oxidation catalysts, etc., it is about 200° C.

In step S14, hydrocarbon, etc. is supplied into the exhaust gas by adding post injection to the in-cylinder fuel injection, etc. In the supply of hydrocarbon, while monitoring the oxygen concentration in the exhaust gas using the value detected by the oxygen concentration sensor 9, a feedback control is performed in the in-cylinder fuel injection in the engine 2 so that the oxygen concentration can reach the concentration at which most of the hydrocarbon is oxidized in the upstream oxidation catalyst 4, i.e., the target oxygen concentration. The target oxygen concentration is predetermined by experiment, etc., and is stored in the control unit 11. As the target oxygen concentration is influenced by the catalyst temperature of the upstream oxidation catalyst 4, the concentration is determined using the value detected by the exhaust gas temperature sensor 10.

In other words, after the exhaust gas is warmed to put the upstream oxidation catalyst 4 in the activation temperature range, hydrocarbon is supplied to the upstream oxidation catalyst 4 by post injection, etc. depending on the injection conditions in the engine. The hydrocarbon is oxidized by the upstream oxidation catalyst 4, and the oxidation reaction heat further increases the temperature of the exhaust gas. Here, when the oxygen concentration in the exhaust gas is low, the hydrocarbon cannot be sufficiently oxidized, and the unoxidized hydrocarbon flows into the downstream oxidation catalyst 5. In this case, the production of the $NO_2$ extremely decreases, so that the NOx purification performance in the selective reduction NOx catalyst 7 is degraded. For this reason, the post injection in the in-cylinder fuel injection is controlled to adjust the amount of the hydrocarbon, and the intake air volume and the multiple injection are controlled to adjust the oxygen concentration. This allows oxidation of hydrocarbon in an amount sufficient to warm the exhaust gas in the upstream oxidation catalyst 4. The intake air volume is adjusted by intake air throttle control, EGR control, exhaust throttle control, etc.

The control in step S14 causes the exhaust gas temperature on the downstream side of the upstream oxidation catalyst 4 to increase and the hydrocarbon in the exhaust gas to be almost eliminated. Accordingly, the NO oxidation activity of the downstream oxidation catalyst 5 improves. As a result, the nitrogen dioxide increases in the exhaust gas having passed through the downstream oxidation catalyst 5.

The higher the temperature of the downstream oxidation catalyst 5 is, the more the nitrogen dioxide is produced, while the lower the temperature is, the less it is produced. Accordingly, while monitoring the value detected by the exhaust gas temperature sensor 10, the in-cylinder fuel injection is further controlled so that the ratio between nitric oxide and nitrogen dioxide, $NO:NO_2$, in the exhaust gas having passed through the downstream oxidation catalyst 5 may equal 50:50.

In the control in step S14, the exhaust gas temperature at which the $NO:NO_2$ predetermined by pre-experiment, etc. equals 50:50 is determined at the position of the exhaust gas temperature sensor 10 in accordance with the operation status of the engine, and this data is stored in the control unit 11 in advance as the control target temperature. Then, in the actual operation, the control target temperature is determined according to the detected operation status of the engine, and a feedback control is performed so that the value detected by the exhaust gas temperature sensor 10 may equal the control target temperature.

In other words, the in-cylinder fuel injection allows hydrocarbon in an amount sufficient to warm the exhaust gas to be supplied to the upstream oxidation catalyst 4 and also allows most of the hydrocarbon to be oxidized by the upstream oxidation catalyst 4. In addition, based on the values detected by the oxygen concentration sensor 9 and the exhaust gas temperature sensor 10, the in-cylinder fuel injection is so controlled that the temperature at the downstream of the upstream oxidation catalyst 4 may equal the control target temperature.

In such control, the oxygen concentration depends on the ratio between the intake air volume and the multiple injection volume; the exhaust gas temperature depends on the magnitude of the intake air volume and the multiple injection volume; and the amount of the hydrocarbon supplied into the exhaust gas depends on post injection. Therefore, the control can be easily accomplished by creating a control map data by pre-experiment, etc. for such intake air volume, multiple injection volume, post injection volume, multiple injection timing, post injection timing, etc, and storing the data in the control unit 11.

More particularly, the higher the multiple injection volume with respect to the intake air volume, i.e., the "multiple injection volume/intake air volume" is, the lower the oxygen concentration is, while the lower it is, the higher the oxygen concentration is. Moreover, the larger the intake air volume and the multiple injection volume are, the higher the exhaust gas temperature is, while the smaller they are, the lower the gas temperature is. Further, the larger the post injection volume is, the larger the amount of the hydrocarbon is, and the higher the exhaust gas temperature is. The lower the post injection volume is, the lower the amount of hydrocarbon and the exhaust gas temperature are.

Now considering the case where the post injection volume is fixed for simplification, the oxygen concentration can be adjusted with the ratio between the intake air volume and the multiple injection volume, and the exhaust gas temperature can be adjusted with the magnitude of the intake air volume and the multiple injection volume. Although in practice, radiation, etc. are involved, the control data containing many elements such as radiation can be obtained by experiment, etc.

Note that in a lower temperature range of the exhaust gas, such control is required. On the other hand, in a middle temperature range and a high temperature range during normal operation, the upstream oxidation catalyst 4 is activated so sufficiently that the hydrocarbon in the exhaust gas emitted from the engine 2 are almost completely removed by oxidation, and that the NO oxidation activity of the downstream oxidation catalyst 5 is high. Consequently, $NO:NO_2$ fully becomes 50:50.

The in-cylinder fuel injection control of step S14 is performed for a given period of time (the time associated with the interval in which the control flow of FIG. 2 is invoked). Then the control returns to the advanced control flow that has invoked the control flow of FIG. 2. The control flow of FIG. 2 is invoked again by the advanced control flow and is thus repeatedly executed. Accordingly, at low temperature, the in-cylinder fuel injection control of step S14 is performed after the control of the temperature rise of the exhaust gas of step S13. Except at low temperature, only the in-cylinder fuel injection control of step S14 is performed. Such control allows the selective reduction NOx catalyst 7 to favorably maintain its NOx purification performance.

Note that the control of the amount of the ammonia solution supplied to the selective reduction NOx catalyst 7 is performed by a different control flow (not shown) than the control flow of FIG. 2. The control of the amount of ammonia solution can be performed by a well-known control method that supplies the solution in an amount corresponding to the NOx amount in the exhaust gas.

As described above, in the NOx purification system 1 and the method for control of a NOx purification system, the in-cylinder fuel injection is so controlled that the hydrocarbon in the exhaust gas may be oxidized mainly by the upstream oxidation catalyst 4, and nitric oxide in the exhaust gas may be oxidized mainly by the downstream oxidation catalyst 5. Moreover, the in-cylinder fuel injection is controlled, based on the value detected by the oxygen concentration sensor 9 disposed upstream of the upstream oxidation catalyst 4, so that the oxygen concentration of the exhaust gas flowing into the upstream oxidation catalyst 4 may equal the oxygen concentration of the exhaust gas at which most of the hydrocarbon in the exhaust gas is oxidized by the upstream oxidation catalyst 4. Furthermore, the in-cylinder fuel injection is controlled, based on the value detected by the exhaust gas temperature sensor 10 disposed upstream of the downstream oxidation catalyst 5, so that the ratio between nitric oxide and nitrogen dioxide in the exhaust gas flowing into the selective reduction NOx catalyst 7 may equal 1:1.

In accordance with the NOx purification system 1 and the method for control of the NOx purification system, the upstream oxidation catalyst 4 oxidizes hydrocarbon (HC) to warm the exhaust gas and to prevent the hydrocarbon from flowing into the downstream oxidation catalyst 5. Accordingly, the NO oxidation activity in the downstream oxidation catalyst 5 for oxidizing nitric oxide (NO) can be improved. The improved NO oxidation activity allows the downstream oxidation catalyst 5 to efficiently oxidize nitric oxide to nitrogen dioxide ($NO_2$), allowing the $NO:NO_2$ ratio in the exhaust gas flowing into the selective reduction NOx catalyst (SCR catalyst) 7 to approach 1:1 (=50:50), and thereby improving the efficiency of the NOx reduction reaction in the selective reduction NOx catalyst 7. In consequence, as shown in FIG. 3, especially the NOx purification performance in a lower temperature range can be improved, and the NOx purification performance of the selective reduction NOx catalyst 7 can be enhanced over the whole temperature range.

Moreover, the above NOx purification system 1 is configured to give at least one of the upstream oxidation catalyst 4 and the downstream oxidation catalyst 5 the function of collecting particulate matter (PM) in the exhaust gas. In other words, at least one of the upstream oxidation catalyst 4 and the downstream oxidation catalyst 5 is formed with a diesel particulate filter including an oxidation catalyst supported-catalyst. This configuration allows collection and removal of the PM in the exhaust gas, and also allows combustion of the PM collected during warming of the oxidation catalyst. Accordingly, the heat generated by the PM oxidation can be utilized to warm the exhaust gas. Consequently, fuel can be saved.

The NOx purification system and the method for control of the NOx purification system of the present invention, which have the above beneficial effects, can be provided in a vehicle-mounted internal combustion engine, etc., to be very effectively used for a NOx gas purification system with a selective reduction NOx catalyst.

What is claimed is:

1. A NOx purification system for reducing NOx in exhaust gas of an engine, comprising:
an exhaust gas passage having an upstream side and a downstream side;
in order from the upstream side to the downstream side, a first oxidation catalyst, a second oxidation catalyst, an ammonia solution supply configured to supply an ammonia solution to the exhaust gas passage, and a selective reduction NOx catalyst;
an oxygen concentration sensor located on the upstream side of the first oxygen catalyst to detect an oxygen concentration in the exhaust gas;
a controller configured to control an in-cylinder fuel injection so that hydrocarbon in the exhaust gas is oxidized by the first oxidation catalyst, and nitric oxide in the exhaust gas is oxidized by the second oxidation catalyst; and
the controller is configured to calculate a target oxygen concentration by using a value detected by an exhaust gas temperature sensor disposed between the first oxidation catalyst and the second oxidation catalyst,
wherein the controller controls an air-intake amount and a multi-injection quantity of the in-cylinder fuel injection such that the detected oxygen concentration is set to be a predetermined target oxygen concentration, which is the oxygen concentration of the exhaust gas flowing into the first oxidation catalyst that is necessary for most of the hydrocarbon of the exhaust gas to be oxidized by the first oxidation catalyst, and
wherein a feedback control of the in-cylinder fuel injection is performed by the controller such that the exhaust temperature becomes equal to a predetermined control target temperature while monitoring the value detected by the exhaust gas temperature sensor.

2. The system as recited in claim 1,
wherein the controller is configured to perform a post-injection, and
wherein the predetermined target oxygen concentration also includes the oxygen concentration of the exhaust gas flowing in the first upstream oxidation catalyst that is necessary for most of the hydrocarbon supplied by the post injection to be oxidized.

3. The system as recited in claim 2, wherein, when performing post-injection, the controller increases the oxygen concentration of the exhaust gas by controlling the air-intake amount and the multi-injection quantity.

4. A method for controlling a NOx purification system for reducing NOx in exhaust gas of an engine, the system including an exhaust gas passage having an upstream side and a downstream side, in order from the upstream side to the downstream side, a first oxidation catalyst, a second oxidation catalyst, an ammonia solution supply supplying an ammonia solution to the exhaust gas passage, and a selective reduction NOx catalyst, and an oxygen concentration sensor located on the upstream side of the first oxygen catalyst, the method comprising:
detecting an oxygen concentration in the exhaust gas;
utilizing a controller to perform the following steps:
controlling an in-cylinder fuel injection so that hydrocarbon in the exhaust gas is oxidized by the first oxidation catalyst, and nitric oxide in the exhaust gas is oxidized by the second oxidation catalyst;
calculating a target oxygen concentration by using a value detected by an exhaust gas temperature sensor disposed between the first oxidation catalyst and the second oxidation catalyst;
controlling an air-intake amount and a multi-injection quantity of the in-cylinder fuel injection such that the detected oxygen concentration is set to be a predetermined target oxygen concentration, which is the oxygen concentration of the exhaust gas flowing into the first oxidation catalyst that is necessary for most of the hydrocarbon of the exhaust gas to be oxidized by the first oxidation catalyst; and performing a feedback control of the in-cylinder fuel injection such that the exhaust temperature becomes equal to a predetermined control target temperature while monitoring the value detected by the exhaust gas temperature sensor.

5. The method as recited in claim 4, further comprising:

controlling a post-injection, wherein the predetermined target oxygen concentration also includes the oxygen concentration of the exhaust gas flowing in the first upstream oxidation catalyst that is necessary for most of the hydrocarbon supplied by the post injection to be oxidized by the first oxidation catalyst.

6. The system as recited in claim 5, wherein, when controlling the post-injection, increasing the oxygen concentration of the exhaust gas by controlling the air-intake amount and the multi-injection quantity.

\* \* \* \* \*